United States Patent [19]
Neefe

[11] Patent Number: 4,597,918
[45] Date of Patent: Jul. 1, 1986

[54] METHOD OF REMOVING SOFT CONTACT LENSES FROM THE MOLD

[76] Inventor: Charles W. Neefe, P.O. Box 429, Big Spring, Tex. 79720

[21] Appl. No.: 725,988

[22] Filed: Apr. 22, 1985

Related U.S. Application Data

[63] Continuation-in-part of Ser. No. 670,386, Nov. 9, 1984, abandoned, which is a continuation-in-part of Ser. No. 544,468, Oct. 24, 1983, abandoned, which is a continuation-in-part of Ser. No. 417,641, Sep. 13, 1982, Pat. No. 4,416,837.

[51] Int. Cl.$^4$ .............................................. B29D 11/00
[52] U.S. Cl. ..................................... 264/2.6; 264/2.1; 264/2.7
[58] Field of Search ................... 264/2.3, 2.6, 2.1, 1.1, 264/2.7

[56] References Cited

U.S. PATENT DOCUMENTS

| 3,361,858 | 1/1968 | Wichterle | 264/2.6 |
| 3,499,862 | 10/1970 | Wichterle | 264/2.3 |
| 3,822,089 | 7/1974 | Wichterle | 264/2.6 |
| 4,042,652 | 8/1977 | Feneberg | 264/2.3 |
| 4,347,198 | 8/1982 | Ohkada et al. | 264/2.3 |

Primary Examiner—James Lowe

[57] ABSTRACT

A method of removing the hard xerogel spin cast lens from the concave spin cast mold by hydrating the lens in the mold. The water is removed from the concave lens surface by evaporation, the convex lens surface in contact with the lens mold retains its moisture. The drying lens having a longer convex surface and a shorter concave lens surface becomes more curved and moves away from the lens mold releasing the xerogel lens from the mold.

12 Claims, 3 Drawing Figures

METHOD OF REMOVING SOFT CONTACT LENSES FROM THE MOLD

This is a continuation in part of application Ser. No. 670,386 entitled; "METHOD OF THINNING THE EDGE OF CONTACT LENSES" filed Nov. 09, 1984 now abandoned which is a continuation-in part of application Ser. No. 544,468 entitled; "AN IMPROVED EDGE FOR ASPHERIC CONTACT LENSES" filed Oct. 24, 1983 now abandoned which is a continuation-in-part of Ser. No. 417,641, now U.S. Pat. No. 4,416,837 entitled; "SIMPLIFIED IMPROVEMENTS IN SPIN CASTING" filed Sept. 13, 1982.

PRIOR ART

The art of spin casting contact lenses has been in use for nineteen years.

Spin casting has proven to be the best process for economically producing large numbers of stock soft contact lenses. The spin cast process provides highly reproducible lenses having controlled parameters.

The principal value of spin casting is its low cost and high production. Lenses made by spin casting also are most comfortable due to the thin and consistent edge shape provided by spin casting.

The disadvantages are the lenses are not spherical and the aspheric surface is of a shape that increases spherical aberration. This has three disadvantages:

(1) The usable optical zone in the center of the lens is reduced requiring the lens to center well.

(2) The reduction in visual acuity due to increased spherical aberration effect.

(3) Visual acuity will fluxuate with lens movement.

A method has been employed whereby the advantages of spin casting may be employed to produce soft contact lenses having large optical zones with improved optical quality and reduced spherical aberration effect. This method requires a matching aspheric curve on the concave surface to neutralize the optical effects of the aspheric concave surface produced by spin casting.

Spin casting also lends itself to rapid ultraviolet curing which provides a predictable molecular structure with few toxic by-products.

SUMMARY OF THE INVENTION

Controlled limited hydration followed by drying and removal of the water from the lens while the lens is in the concave spin cast mold provides a method of removing the hard xerogel lens from the mold. It is the accepted practice to hydrate and swell the soft lens away from the concave spin cast mold. The system works well, however, the lens edge and posterior surface must be finished before the lens is removed from the mold. The hydrated and softened lens cannot be successfully cut or polished as the hydrated lens is a soft flexible gel. A method has been found whereby the radius of curvature is shortened whereby the hard xerogel lens separates itself from the concave spin casting mold. The hard rigid xerogel lens may then be processed by the methods developed for hard contact lenses. The edge of the hard xerogel lens may be contoured and polished. The junction between these curves may be blended for improved lens comfort. None of these operations may be accomplished if the lens is removed from the mold by swelling and hydration. Good optical quality demands that the lens adhere to the mold during and after polymerization. The lenses are currently removed by hydration and swelling in alcohol or hot water to free the lens from the concave spin cast mold. Examples of the alcohols used are: ethyl alcohol, methyl alcohol, propanol and butanol.

The present invention accomplished the release of the xerogel lens from the mold by partially hydrating the lens with water or alcohol and allowing the lens to air dry. The concave lens surface in contact with the atmosphere loses water by evaporation. The convex lens surface in contact with the mold retains its moisture. The shrinkage of the concave lens surface shortens the lens radius of curvature, pulling the edges away from the mold and releasing the partially dried lens from the mold. The lens then rapidly loses the small amount of water present in the convex surface providing a undistorted hard xerogel lens.

DESCRIPTION OF THE PREFERRED EMBODIMENTS

Figure 1:
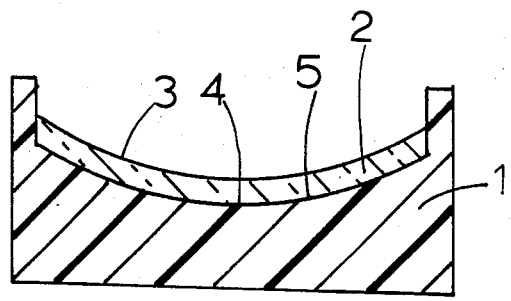
FIG. 1 shows the xerogel spin cast lens in the mold in section.
Figure 2:
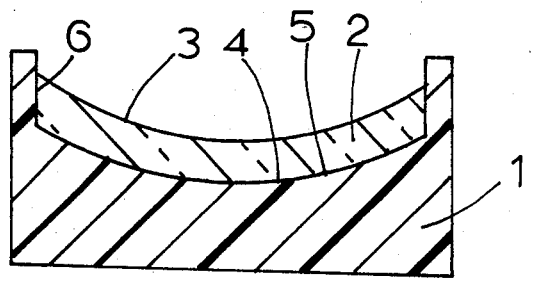
FIG. 2 shows the hydrogel spin cast lens in the mold in section.
Figure 3:
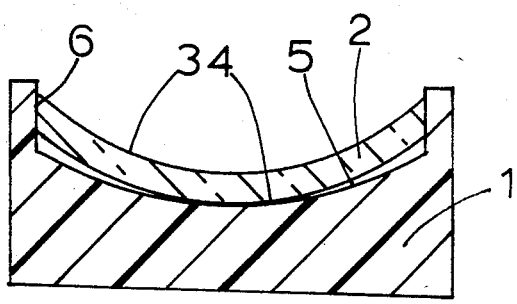
FIG. 3 shows the partially dehydrated lens free from the mold in section.

The lens mold material is injection molded to form the spin cast lens mold 1 FIGS. 1, 2 and 3. Examples of the mold materials are nylon, polypropylene, acrylics and acrylonitrile. An example of a spin casting hydrogel formulation is as follows:

Hydroxyethylmethacrylate: 95% by weight
methyl methacrylate: 2.5% by weight
ethylene dimethacrylate: 2% by weight
methyl ethyl Benzoin: 0.5% by weight The lens monomer 2 FIG. 1 is placed in the rotating lens mold 1 FIG. 1 and rotated to form a liquid lens having a convex surface 4 FIG. 1 molded against the concave mold surface 5 FIG. 1 and a spin cast concave lens surface 3 FIG. 1. The lens material 2 FIG. 1 is exposed to ultraviolet light to achieve polymerization forming a hard xerogel lens. The xerogel lens 2 FIG. 2 is placed in water and allowed to absorb water and expand in thickness. The convex lens surface 4 FIG. 2 is in contact with the concave mold surface 5 FIG. 2. The concave lens surface 3 FIG. 2 moves further from the convex surface 4 FIG. 2 due to the lens increasing in volume due to water absorption. The lens 2 FIG. 2 remains firmly seated in the mold 1 FIG. 2 due to the outward pressure against the mold side 6 FIG. 2. The adhesion between the concave mold surface 5 FIG. 2 and the convex lens surface 4 FIG. 2 remains unbroken as the expanded lens is forced against the mold edge 6 FIG. 2 and the concave mold surface 5 FIG. 2. The hydrated lens 2 FIG. 2 and the mold 1 FIG. 2 are removed from the water and allowed to dry.

When drying begins, the concave lens surface 3 FIG. 2 loses water. The convex lens surface 4 FIG. 2 cannot lose water as it is in contact with mold surface 5 FIG. 2. The drying process is allowed to proceed and the concave lens surface 3 FIG. 3 shrinks, the convex surface 4 FIG. 3 against the mold surface 5 FIG. 2 does not shrink. The pressure against the mold side wall 6 FIG. 3 is reduced as the drying lens loses volume. The dry shorter radius concave surface 3 FIG. 3 contracts and the longer wet surface 4 FIG. 3 which does not contract results in a more curved lens shape. The now more convex lens surface 4 FIG. 3 separates from the concave mold surface 5 FIG. 3 freeing the lens 2 FIG. 3 from the mold 1 FIG. 3. The mold may now be reused to form another lens. The freed lens quickly loses the small amount of remaining moisture from the convex surface. The dry lenses have true optical surfaces and the xerogel lens may now be processed in any manner that is possible with a hard xerogel lens. The finished xerogel lenses may be sold and shipped in the dry hard state and hydrated before use.

Soft hydrogel lenses which are allowed to dry become distorted and look somewhat like a dry cornflake. Drying the lens while attached to the optical mold provides undistorted xerogel lenses which may be finished by any conventional means. Alcohols have been added to the hydrating water and saline solutions in amounts of from 10 percent to 70 percent by weight to speed evaporation.

Various modifications can be made without departing from the spirit of this invention or the scope of the appended claims. The constants set forth in this disclosure are given as examples and are in no way final or binding. In view of the above it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. A method of removing spin cast xerogel lenses from the concave surface of the spin cast mold by the steps of hydrating and swelling the lens, allowing the hydrated lens to shrink and partially dehydrate by evaporating water from the concave lens surface, the convex lens surface being attached to the concave mold surface remains swelled and hydrated, the shrinkage of the concave lens surface provides a lens having a shorter radius of curvature than the radius of curvature present on the concave spin casting mold and the shorter radius lens separates from the longer radius lens mold.

2. A method of removing undistorted spin cast xerogel lenses from the concave surface of the spin cast mold by the steps of hydrating and swelling the lens, the hydrated convex surface remaining attached to the concave mold surface, allowing the hydrated lens to dehydrate by evaporating water from the concave lens surface, the dehydration and shrinkage in volume of the concave lens surface provides a lens having a shorter radius of curvature than that present on the concave spin casting mold and the shorter radius lens is freed from the spin cast lens mold.

3. A method of removing an undistorted spin cast xerogel lens from the concave surface of a spin cast mold by the steps of, hydrating and swelling the lens, the convex lens surface remaining attached to the concave spin cast mold surface, evaporating water from the concave lens surface to partially dehydrate the lens, the dehydration and shrinkage of the concave lens surface provides a lens having a radius of curvature shorter than the radius of curvature present on the concave spin casting mold and the shorter radius lens is separated and freed from the longer radius spin cast mold, the lens is allowed to fully dehydrate and assume the undistorted xerogel lens shape.

4. A method as in claim 1 wherein alcohol is added to the hydrating water in amounts of from 10 percent to 70 percent by weight.

5. A method as in claim 2 wherein methyl alcohol is added to the hydrating water in amounts of from 10 percent to 70 percent by weight.

6. A method as in claim 3 wherein ethyl alcohol is added to the hydrating water in amounts of from 10 percent to 70 percent by weight.

7. A method as in claim 1 wherein alcohol is added to the hydrating saline in amounts of from 10 percent to 70 percent by weight.

8. A method as in claim 2 wherein ethyl alcohol is added to the hydrating saline in amounts of from 10 percent to 70 percent by weight.

9. A method as in claim 3 wherein methyl alcohol is added to the hydrating saline in amounts of from 10 percent to 70 percent by weight.

10. A method as in claim 1 wherein the edges are contoured and polished after the lens is removed from the mold.

11. A method as in claim 2 wherein the edges are contoured and polished after the lens is removed from the mold.

12. A method as in claim 3 wherein the edges are contoured and polished after the lens is removed from the mold.

* * * * *